United States Patent
Kumar

(10) Patent No.: US 9,665,858 B1
(45) Date of Patent: May 30, 2017

(54) CARDLESS PAYMENT TRANSACTIONS WITH MULTIPLE USERS

(71) Applicant: Square, Inc., San Francisco, CA (US)

(72) Inventor: Abhay Kumar, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 13/649,603

(22) Filed: Oct. 11, 2012

(51) Int. Cl.
*G06Q 40/00* (2012.01)
*G06Q 20/10* (2012.01)
*G06Q 30/04* (2012.01)
*G06Q 20/04* (2012.01)

(52) U.S. Cl.
CPC ........... *G06Q 20/102* (2013.01); *G06Q 20/04* (2013.01); *G06Q 20/10* (2013.01); *G06Q 30/04* (2013.01); *G06Q 40/00* (2013.01)

(58) Field of Classification Search
CPC .... G06Q 50/01; G06Q 20/102; G06Q 20/327; G06Q 20/3278; G06Q 20/36; G06Q 20/3821; G06Q 30/02; G06Q 10/0637; G06Q 20/12; G06Q 20/204; G06Q 20/40; G06Q 30/06; G06Q 30/0601; G06Q 50/24; G06Q 40/12; G06Q 20/085; G06Q 20/227; G06Q 30/04; G06Q 30/0643; G06Q 40/10; G06Q 50/06
USPC ......................................................... 705/40
See application file for complete search history.

(56) References Cited

U.S. PATENT DOCUMENTS

| | | | |
|---|---|---|---|
| 5,844,572 A | 12/1998 | Schott | |
| 8,020,763 B1 * | 9/2011 | Kowalchyk | 235/380 |
| 2003/0115095 A1 | 6/2003 | Yamauchi | |
| 2004/0248548 A1 | 12/2004 | Niwa et al. | |
| 2006/0282660 A1 | 12/2006 | Varghese et al. | |
| 2010/0082481 A1 | 4/2010 | Lin et al. | |
| 2010/0280860 A1 * | 11/2010 | Iskold et al. | 705/7 |
| 2011/0145049 A1 | 6/2011 | Hertel et al. | |
| 2011/0178883 A1 * | 7/2011 | Granbery et al. | 705/16 |
| 2011/0238517 A1 * | 9/2011 | Ramalingam | G06Q 20/10 705/26.1 |
| 2011/0251892 A1 * | 10/2011 | Laracey | 705/14.51 |
| 2011/0283188 A1 | 11/2011 | Farrenkopf et al. | |

(Continued)

OTHER PUBLICATIONS

*Splitwise*. Splitwise. Last updated Nov. 4, 2014. Retrieved from the internet on Nov. 4, 2014. Retrieved from the internet: URL<https://www.splitwise.com>. 2 pages.

(Continued)

*Primary Examiner* — Rajesh Khattar
(74) *Attorney, Agent, or Firm* — Lee & Hayes, PLLC

(57) ABSTRACT

A method of managing a cardless payment transaction between a customer and a merchant includes receiving, from a device of a customer, an indication of consent to join the customer to a cardless payment transaction, where the cardless payment transaction is between one or more other customers and the merchant; receiving from the customer device, location data indicating that the customer device is in proximity with the merchant; joining the customer with the cardless payment transaction between the one or more other customers and the merchant; receiving transaction data between the merchant and each customer; and submitting, for each customer associated with the cardless payment transaction, a transaction between the merchant and the customer to a financial service for authorization.

36 Claims, 7 Drawing Sheets

(56) References Cited

U.S. PATENT DOCUMENTS

| | | | |
|---|---|---|---|
| 2011/0307282 | A1 | 12/2011 | Camp et al. |
| 2011/0313871 | A1 | 12/2011 | Greenwood |
| 2012/0130903 | A1 | 5/2012 | Dorsey et al. |
| 2012/0166332 | A1* | 6/2012 | Naaman .......................... 705/40 |
| 2012/0265676 | A1 | 10/2012 | Gould et al. |
| 2013/0132274 | A1 | 5/2013 | Henderson et al. |
| 2013/0246220 | A1 | 9/2013 | Hammad et al. |
| 2013/0290040 | A1 | 10/2013 | Perry et al. |
| 2013/0317893 | A1* | 11/2013 | Nelson et al. ............... 705/14.5 |
| 2014/0156517 | A1 | 6/2014 | Argue et al. |

OTHER PUBLICATIONS

*Splitwise*. Google Play. Last updated Oct. 15, 2014. Retrieved from the internet on Nov. 4, 2014. Retrieved from the internet: URL<https://play.google.com/store/apps/details?id=com.Splitwise.SplitwiseMobile>. 2 pages.
*Splitabill*. Splitabill. Last updated Nov. 4, 2014. Retrieved from the internet on Nov. 4, 2014. Retrieved from the internet: URL<https://splitabill.com/tour/>. 2 pages.
*Splitabill*. iTunes Preview. Last updated Oct. 15, 2012. Retrieved from the internet on Nov. 4, 2014. Retrieved from the internet: URL<https://itunes.apple.com/us/app/splitabill/id485048203>. 2 pages.
*Billr*. Billr. Last updated Oct. 16, 2013. Retrieved from the internet on Nov. 4, 2014. Retrieved from the internet: URL<http://billr.me/>. 4 pages.
*Billr*. iTunes Preview. Last updated Nov. 3, 2012. Retrieved from the internet on Nov. 4, 2014. Retrieved from the internet: URL<https://itunes.apple.com/us/app/billr-bill-splitting-at-table/id501889312?1s=l&mt=8>. 2 pages.
*Divvy That Up*. Divvy That Up. Last updated Sep. 17, 2013. Retrieved from the internet on Nov. 4, 2014. Retrieved from the internet: URL<http://www.divvythatup.com>. 5 pages.
*Divvy*. iTunes. Last updated Sep. 26, 2013. Retrieved from the internet on Nov. 4, 2014. Retrieved from the internet: URL<https://itunes.apple.com/us/app/divvy/id560503890?1s=1&mt=8>. 2 pages.
*dapShare*. dapShare. Last updated Nov. 4, 2014. Retrieved from the internet on Nov. 4, 2014. Retrieved from the internet: URL<http://dapshare.com>. 2 pages.
*dapShare*. Google Play. Last updated Nov. 23, 2011. Retrieved from the internet on Nov. 4, 2014. Retrieved from the internet: URL<https://play.google.com/store/apps/details?id=com.dapshare&hl=en>. 2 pages.
*WeSplit.It*. WeSplit.It. Last updated Nov. 4, 2014. Retrieved from the internet on Nov. 4, 2014. Retrieved from the internet: URL<https://wesplit.it/>. 2 pages.
Goode, Lauren. *Paying With Square's New Mobile-Payments App*. All Things D. Published Apr. 30, 2012. Retrieved on Nov. 7, 2014. Retrieved from the Internet: URL<http://allthingsd.com/20120430/paying-with-squares-new-mobile-payments-app/>. 3 pages.
Non-Final Office Action mailed Oct. 14, 2014, for U.S. Appl. No. 13/925,683, of Clark, C., et al., filed Jun. 24, 2013.
Final Office Action mailed May 13, 2015, for U.S. Appl. No. 13/925,683, of Clark, C., et al., filed Jun. 24, 2013.
Non-Final Office Action mailed Aug. 26, 2015, for U.S. Appl. No. 14/140,212, of Chin, A., et al., filed Dec. 24, 2013.
Non-Final Office Action mailed Nov. 17, 2015, for U.S. Appl. No. 13/925,683, of Clark, C., et al., filed Jun. 24, 2013.
Final Office Action mailed May 19, 2016, for U.S. Appl. No. 13/925,683, of Clark, C., et al., filed Jun. 24, 2013.
Non-Final Office Action mailed Oct. 18, 2016, for U.S. Appl. No. 13/925,683, of Clark, C., et al., filed Jun. 24, 2013.
Non-Final Office Action mailed Feb. 10, 2017, for U.S. Appl. No. 14/569,451, of Abrams, Z.C., et al., filed Dec. 12, 2014.

* cited by examiner

CARDLESS PAYMENT TRANSACTIONS WITH MULTIPLE USERS

TECHNICAL FIELD

This disclosure relates to cardless payment transactions with multiple users.

BACKGROUND

In a conventional point-of-sale electronic credit card transaction, the transaction is authorized and captured. In the authorization stage, a physical credit card with a magnetic stripe is swiped through a merchant's magnetic card reader, e.g., as part of a point-of-sale device. A payment request is sent electronically from the magnetic card reader to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the merchant. In the capture stage, the approved transaction is again routed from the merchant to the credit card processor, card network and card issuer, and the payment request can include the cardholder's signature (if appropriate). The capture state can trigger the financial transaction between the card issuer and the merchant, and optionally creates a receipt. There can also be other entities, e.g., the card acquirer, in the route of the transaction. Debit card transactions have a different routing, but also require swiping of the card.

Many transactions require that a customer sign a physical receipt, electronically approve a transaction, e.g., by pressing an approve button on a user interface, electronically sign for the transaction, e.g., with a stylus or finger on an electronic signature capture device with a touch sensitive pad, or enter an authorizing personal identification number (PIN).

Many transactions also include multiple customers. If multiple customers are parties to a bill, the customers can agree upon their respective portions of the bill. Sometimes customers settle up with each other, e.g., one customer pays the bill by payment card and the other customers give that person cash. Sometimes customers ask the merchant to split a bill, e.g., several customers might provide payment cards to the merchant and request that the bill be split evenly between the cards.

SUMMARY

Splitting a bill can be an inconvenience to both the customers and the merchant. If the customers desire to settle up between themselves, then a calculator might be needed to calculate the individual portions of the bill. In addition, some customers might not have cash on hand. On the other hand, it is also inconvenient for the merchant (particularly for an employee such as a server at a restaurant) to split the bill between multiple cards, as this requires calculation of the individual amounts and obtaining authorization for each card.

A different approach is for multiple customers to join in a cardless payment transaction. This approach dispenses with swiping of a credit card. Instead, each customer provides authorization to join a cardless payment transaction with a merchant. In some implementations, each customer can also manage the amount owed on a portion of a bill using a mobile device. The payment service system can process the cardless payment transaction and charge each customer for a portion of the bill using a cardless payment transaction. Therefore, none of the customers have to swipe a credit card. Employees of the merchant do not need to calculate individual amounts for each customer, and the merchant can be provided with one combined bill from the payment service system.

In one aspect, a method of managing a cardless payment transaction between a customer and a merchant includes receiving, from a device of a customer, an indication of consent to join the customer to a cardless payment transaction, where the cardless payment transaction is between one or more other customers and the merchant; receiving from the customer device, location data indicating that the customer device is in proximity with the merchant; joining the customer with the cardless payment transaction between the one or more other customers and the merchant; receiving transaction data between the merchant and each customer; and submitting, for each customer associated with the cardless payment transaction, a transaction between the merchant and the customer to a financial service for authorization.

Implementations may include one or more of the following features. The transaction data includes a plurality of items or services ordered by one or more customers associated with the cardless payment transaction. Sending, for each item or service in the plurality of items or services, a purchase notification of the item or service to each customer associated with the cardless payment transaction. Before the submitting, receiving one or more modifications to the cardless payment transaction, where the one or more modifications change an amount owed by one or more customers associated with the cardless payment transaction. The one or more modifications include one or more of the following: splitting a total cost of the transaction equally, splitting the total cost on a percentage basis, splitting the total cost on a per-item basis. After the submitting, sending a receipt to the merchant, where the receipt includes one bill amount, one tax amount, or one tip amount. After the submitting, sending an individual receipt to the merchant for each customer associated with the cardless payment transaction, where the individual receipt includes payment information between the customer and the merchant.

In another aspect, a method of managing a transaction between a customer and a merchant includes receiving, from a server system, a plurality of nearby cardless payment transactions that are associated with the customer; displaying the plurality of nearby cardless payment transactions; receiving first input from a user interface of a mobile device, where the first input indicates consent to join a cardless payment transaction in the plurality of nearby cardless payment transactions; sending, to the server system, location data indicating the customer is in proximity with the merchant; sending, to the server system, the indication of consent and the location data; receiving from the server system an indication that the customer is joined to the cardless payment transaction; and displaying the indication on the mobile device.

Implementations may include one or more of the following features. Receiving second input from the user interface, where the second input indicates one or more modifications to the cardless payment transaction, where the one or more modifications change an amount owed by one or more customers associated with the cardless payment transaction; sending the second input to the server system. Receiving third input from the user interface, where the third input indicates finalizing an individual portion of the cardless payment transaction, where the individual portion is associated with the customer; and sending the indication to the server system.

In another aspect, a method of managing a transaction between a first customer, a second customer, and a merchant, includes sending, to a server system, location data indicating that the first customer is in proximity with the merchant; displaying an indication on a user interface of the first mobile device that a tab of a cardless payment transaction is opened for the first customer; receiving first input from the user interface of the first mobile device requesting that a second customer be joined to the cardless payment transaction; sending, to a server system, the request that the second customer be added to the cardless payment transaction; and receiving from the server system an indication that the second customer is joined to the cardless payment transaction.

Implementations may include one or more of the following features. The method of claim 11, wherein receiving first input includes displaying a list of users and receiving a selection of the second customer from the list.

Advantages may include one or more of the following. One customer can invite other customers to join a cardless payment transaction. Multiple customers can participate in a point-of-sale electronic payment transaction with a merchant without swiping of their cards. In addition, the customers can conduct the transaction without having to access their own wallets. Merchants can be provided with one bill for a cardless payment transaction from a payment service system even if multiple customers pay individually. The payment service system can calculate a customized portion of a bill for each customer to pay and charge the respective customer.

BRIEF DESCRIPTION OF THE DRAWINGS

Like reference numbers and designations in the various drawings indicate like elements.

DETAILED DESCRIPTION

On the one hand, it would be generally convenient for multiple customers to dispense with swiping their credit cards. On the other hand, the risk of unauthorized transactions is a potential problem in a cardless payment transaction. An approach for conducting an electronic payment transaction without swiping a card is for the customers to provide authorization for performing a cardless payment transaction with a merchant.

As an overview, the system allows multiple customers to conduct cardless payment transactions with a merchant. The system also allows the customers (also called users or payers) to purchase items or services from the merchant while physically present at the merchant, e.g., at a point of sale, but using a cardless payment transaction. A cardless payment transaction is one where a customer conducts the transaction with a merchant at a point of sale using a financial account, e.g., credit card account, without physically presenting a payment card to the merchant at the point of sale. In fact, the merchant need not receive any details about the financial account, e.g., the credit card issuer, credit card number, and the like is not provided to the merchant.

From each customer's perspective, the customer first signs up for an account with the cardless payment system. The sign-up process requires certain information, such as information about a financial account sufficient to perform a transaction with the account. For example, if the financial account is a credit card account, then credit card information can be provided, e.g., credit card number and expiration date. The customer can also sign up with other payment methods such as debit cards, pre-paid cards, bank accounts, or other third party financial accounts. The sign up process can also require contact information for the customer, e.g., mailing address and email, and other personal identifying information, e.g., a photograph of the customer. After creating an account, the customer can select a merchant that also has an account with the cardless payment system. The customer can give consent to perform a cardless payment transaction with the merchant if the customer is within a predetermined distance from the merchant. After the customer gives consent, the merchant can, without a presentment of the physical payment card, charge (in the case of credit cards) or debit (in the case of debit cards) the customer's financial account for items the customer wants to buy. Because the customer's payment card is already on file with the cardless payment system, the customer does not need to physically present a credit card to the merchant.

Figure 1:
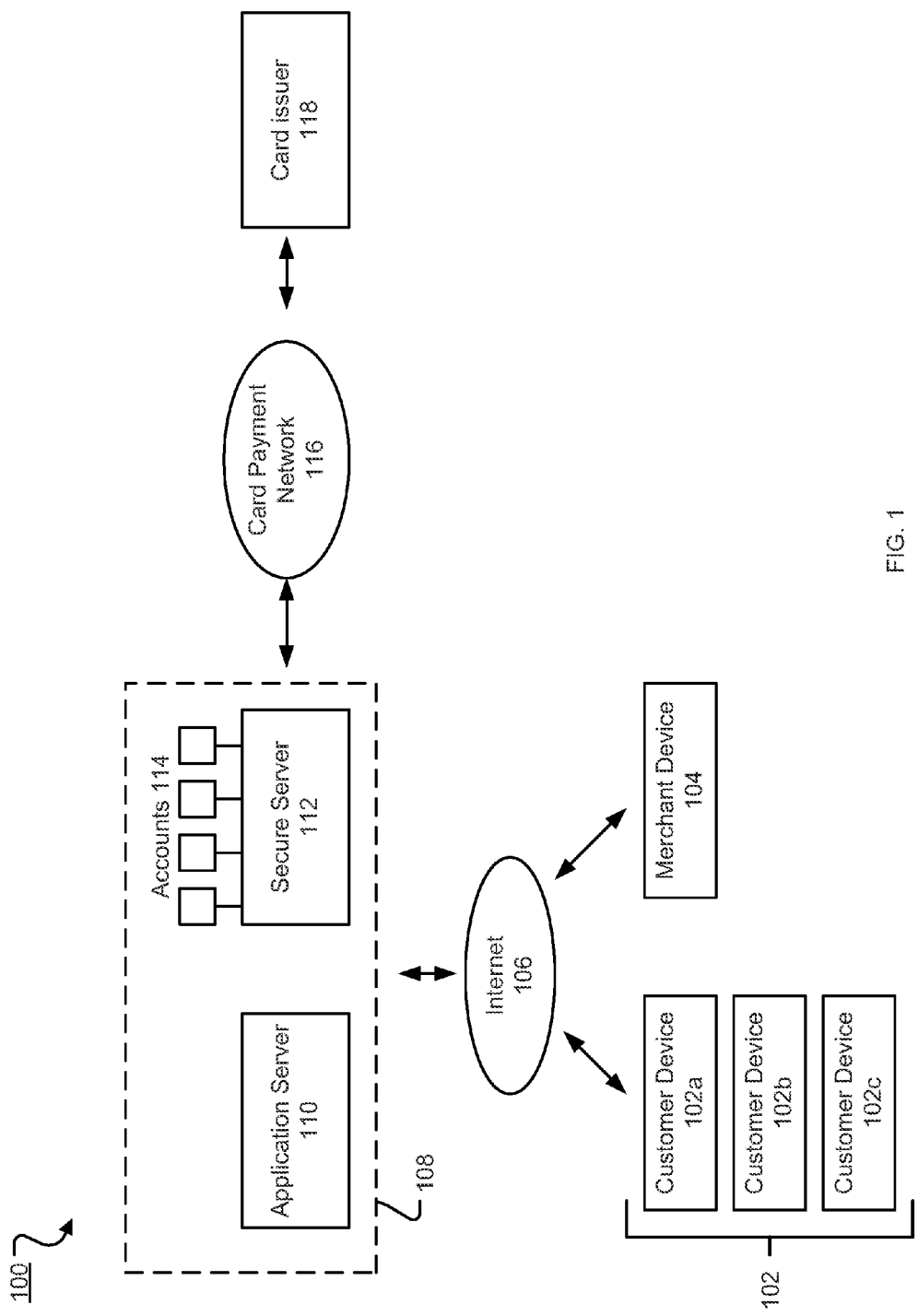
FIG. 1 is a schematic illustration of an example cardless payment system architecture.

FIG. 1 is a schematic illustration of the architecture of an example cardless payment system 100. The overall system 100 includes multiple customer devices 102 and merchant device 104 connected to a network, e.g., the Internet 106. In general, there is one customer device per customer who will join in the cardless payment transaction. Although FIG. 1 illustrates three customer devices 102a, 102b, 102c, there could be just two customer devices, or four or more customer devices. Each customer device 102 is a mobile computing device, i.e., a hand-held computing device, capable of running a customer application. For example, each customer device 102 can be a smartphone or tablet computer. The merchant device 104 is also a computing device, capable of running a merchant application. The merchant device 104 can be a mobile device, or it can be a desktop computer, a laptop computer, a dedicated point of sale system, or other data processing apparatus.

A cardless payment processor operates a payment service system 108. The customer and merchant devices can communicate with the payment service system 108 using the network 106. The payment service system 108 includes an application server 110 and a secure server 112 to process all transactions between each customer device 102 and merchant device 104. In general, the application server 110 handles non-secure information. For example, it can store public merchant information such as the merchant's address or phone number. The application server 110 can also be responsible for transferring or updating the customer application to each customer's mobile device or transferring or updating the merchant application to the merchant's computing device. In particular, the application server 112 can be responsible for sending information about merchants that have accounts with the cardless payment system to each customer device 102. The secure server 112 handles secure information such as credit card numbers, debit card numbers, bank accounts, customer accounts, customer identifying information or other sensitive information.

The payment service system 108 can communicate electronically with a card payment network 116, e.g., Visa, Mastercard, or the like. The payment service system 108 can communicate with a computer system 116 of a card payment network, e.g., Visa or MasterCard. The payment service system 108 can communicate with a computer system 116 over the same network 106 used to communicate with each customer device 102, or over a different network. The computer system 116 of the card payment network can communicate in turn with a computer system 118 of a card issuer, e.g., a bank. There can also be computer systems of other entities, e.g., the card acquirer, between the payment service system 108 and the card issuer.

Before a transaction between each customer and the merchant can be performed using the cardless payment system, each customer must create a customer account with the payment service system 108 and the merchant must create a merchant account with the payment service system 108.

A customer, e.g., an owner of a customer device 102a, 102b, or 102c, can sign up using a mobile application or using an online website, and can use the mobile device 102 or another computing device, e.g., a home computer. At some point prior to the transaction, a customer application is downloaded to the customer device 102, e.g., through an application store. Creation of the customer account can be handled through the customer application, or through another application, e.g., a generic web browser. The customer enters a name, account password, and contact information, e.g., email address. Before a transaction can be performed, the customer also enters financial account information sufficient to conduct the transaction into the payment service system 108. For example, in the case of a credit card account, the customer can enter the credit card issuer, credit card number and expiration date into the payment service system 108; the card validation value and mailing address may also be required. However, the financial account could also be associated with a debit card or pre-paid card, or another third party financial account.

In some implementations, the payment service system 108 requires additional personal identifying information before a transaction can be performed. For example, the payment service system 108 may require a photo of the customer before a transaction can be performed. The photo of the customer would be provided to the merchant so that the merchant can compare the photo to the person. In addition, the payment service system 108 can require a personal identification number (PIN) be entered by the customer. Other requirements can also be added to increase security. The data associated with a customer account 114 can be stored at the secure server 112, e.g., in a database.

If the customer is signing up with a mobile application, the customer's financial account information can be entered by swiping the financial transaction card through a slot of a card reader coupled to the mobile device. Alternatively, the customer can enter in financial account information by typing in information at the mobile device 102, selecting a card from an application on the mobile device, from an online entity, or others. In some implementations, another external application generates a receipt that is sent to the customer. The receipt then includes a hypertext link that allows a customer to easily create a customer account in the cardless payment system. For example, activating the link in the receipt can automatically create a customer account with a payment card prefilled with the card used in the receipt to reduce effort by the customer. In effect, activating a new account using a receipt auto-verifies the customer into the cardless payment system.

The merchant can sign up for an account using the merchant device 104 or another device. The merchant enters a name, account password, and contact information, e.g., email address, and physical location information, e.g., an address, into the payment service system 108. The merchant can also provide other information, e.g., a list of goods or services available, operating hours, phone number, a small identifying image logo or mark, to the payment service system 108. The data associated with the merchant account 114 can be stored at the secure server 112, e.g., in a database.

At some point prior to the transaction, a merchant application is downloaded to the merchant device 102, e.g., through an application store. Creation of the merchant account can be handled through the merchant application, or through another application, e.g., a generic web browser.

Eventually, in order to receive funds from the transaction, the merchant will need to enter financial account information into the payment service system sufficient to receive funds. For example, in the case of a bank account, the customer can enter the bank account number and routing number. However, the merchant's financial account can also be associated with a credit card account or another third party financial account. In addition, in some implementations, if the merchant has not entered the financial account information, the cardless payment processor can hold the received funds until the financial account information is provided.

Figure 2:
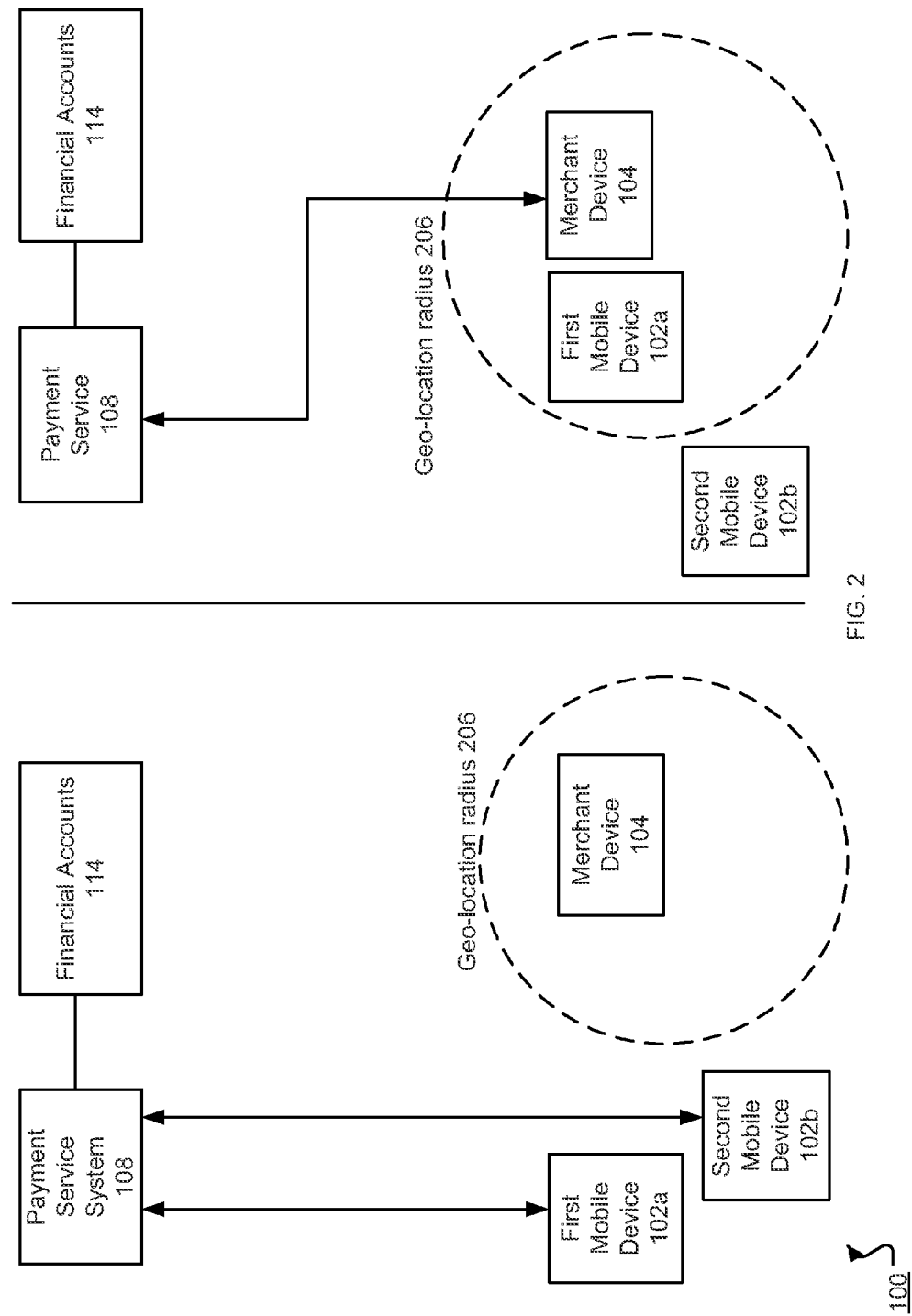
FIG. 2 is a diagram of an example implementation of the cardless payment system.

FIG. 2 is a diagram that outlines an example implementation of the cardless payment system 100. A first customer carries a first mobile device 102a with the customer application installed, a second customer carries a second mobile device 102b with the customer application installed, and a merchant has a device 104 with the merchant application installed. Customers and merchants each have an association, e.g., an account, with the payment service system 108.

The system can predetermine a geo-location distance 206, e.g., a radius, around the location of the merchant. In some implementations, the geo-location distance 206 is 500 feet. In some implementations, the geo-location distance 206 can be set by the merchant, e.g., the payment service system 108 receives input from the merchant device 104 or another computer system of the merchant setting the location radius. In some implementations, the payment service system 108 may limit the radius set by the merchant to a maximum location radius.

If each customer device 102a-b is located outside an area of the geo-location radius 206 around the merchant, the merchant application does not provide an option to conduct a cardless payment transaction with the customers. In this case, each customer device 102a-b will indicate it is outside the geo-location radius 206 of the merchant, and the merchant device 104 will be unable to charge the customers' financial accounts, as further described in reference to FIG. 3.

Figure 3:
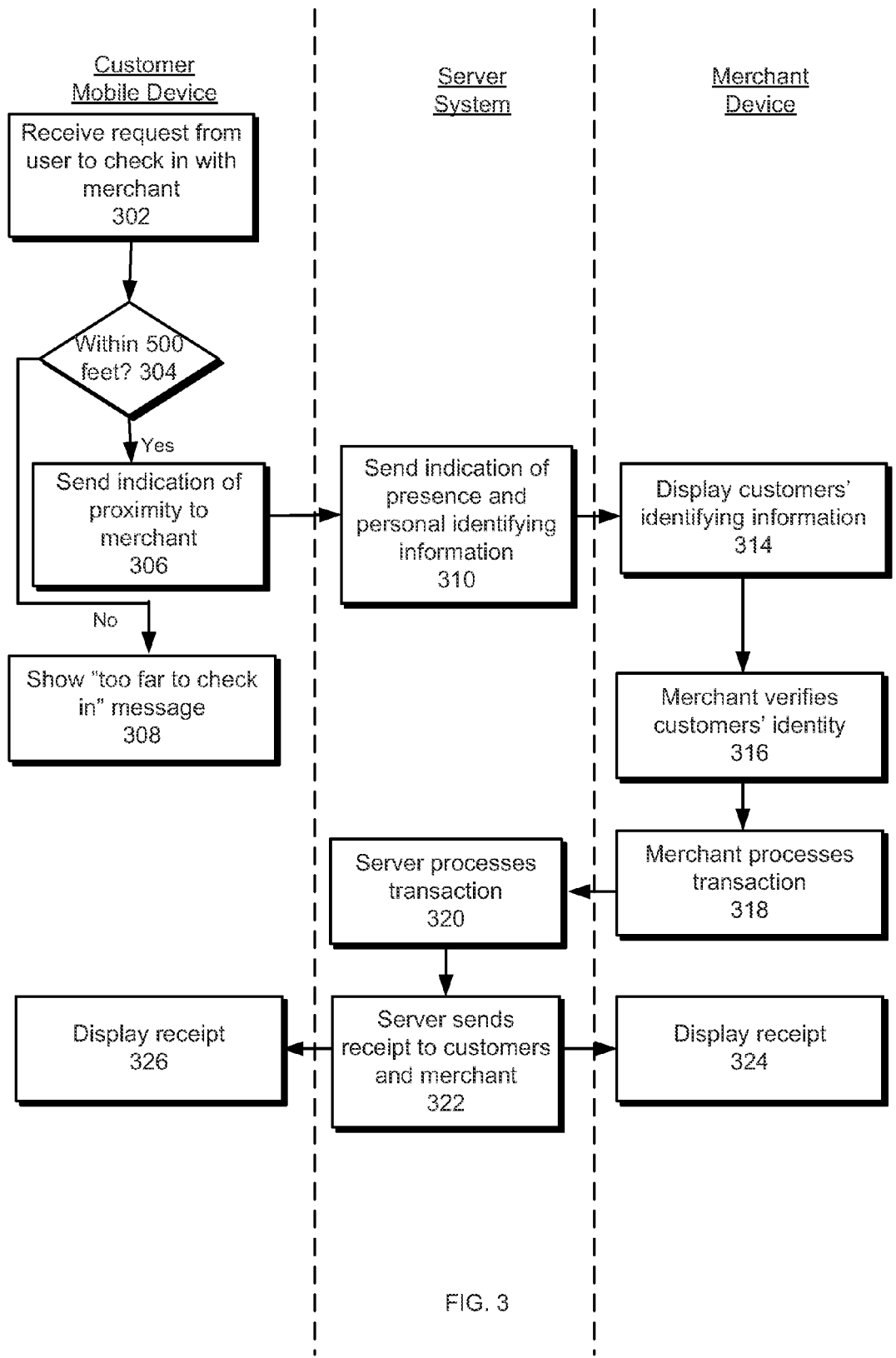
FIG. 3 is a diagram of an example flow chart of the cardless payment system between a merchant and a user.

If the first mobile device 102a is located within the area of the geo-location radius 206 around the merchant, the first customer can "check-in" with the merchant using an application on the first mobile device 102a as further described in reference to FIG. 3. The first customer can configure the application to automatically "check-in" with the merchant once the first customer is within the geo-location radius 206 of the merchant, which will be further described below. In some implementations, the first customer can configure the application to set a maximum amount that can be charged per transaction with the merchant. Checking in with a merchant allows the merchant application to display an option to charge the first customer's financial account using a cardless payment transaction. In essence, checking in constitutes a consent by the first customer to conduct a cardless transaction with the merchant. This consent differs from actual authorization of the transaction, which the first customer would provide, e.g., verbally, upon learning the amount of the transaction. Checking in can be thought of as "opening a tab" with the merchant, which allows the merchant to initiate a transaction that will later be charged to the customer's financial account upon "closing the tab."

In some implementations, the first customer of device 102a invites the second customer of device 102b to join the cardless transaction that was initiated by the first mobile device 102a, or the second mobile device 102b gives consent to join the cardless transaction. The second mobile device 102b can be located inside or outside the geo-location radius 206 for these implementations, as will be discussed further below in reference to FIG. 4.

In some implementations, in order to determine whether the first mobile device 102a is within the geo-location radius 206 of the merchant device 104, the merchant's location, e.g., address, and the geo-location radius 206 for the merchant are provided to the first mobile device 102b. The first mobile device 102b can then use a geofencing function. For example, the first mobile device 102b determines its own location, e.g., based on GPS information, cellphone data, wireless network data, or the like, and then determines whether its own location is within the geo-location radius 206 of the merchant location. In other cases, the first mobile device 102b can provide geographical data, e.g., through cellular data or WiFi, that a server can use to ascertain location information.

FIG. 3 is a diagram of an example flow chart of a process of initiating a cardless payment transaction with a merchant using the cardless payment system 100. The cardless payment transaction is initiated by a first customer before other customers join the cardless payment transaction. The joining process is described below in reference to FIG. 4.

The process conducted with the cardless payment system 100 involves relationships between a first customer's mobile device, a server system, and a merchant's device. The server system can reside in the payment service system 108 and be configured to send and receive communications between the first customer device and the merchant device. The server system can include the application server 110 and/or the secure server 112. The communications can be encrypted using secure protocols built into the first customer device, server system, and merchant device. In some implementations, this process is implemented through the applications installed on both the first customer's mobile device and the merchant's device.

In a typical situation, the first customer enters a request into the mobile device 102 to identify a merchant that will perform cardless payment transactions. The mobile device 102 directs the request to the server system. The request can be accompanied by location information, e.g., as determined by the mobile device 102. The server system receives the request, and selects one or more merchants based on the location information from the first customer and the stored location information for the merchant. At least an identification of the merchant and the location information for the merchant is sent to the mobile device 102.

The first customer may input a request for further information about a merchant, e.g., press a "More Info" button on the user interface of the customer application. In response, the first customer device can display further information received from the merchant, e.g., the list of goods or services available, operating hours, and phone number.

The first customer sends an indication of consent to perform a cardless payment transaction with the merchant to the server system. For example, the first customer can request to "check in" with a merchant by interfacing with the customer application on the first customer device (step 302); this request can constitute the indication of consent.

Alternatively, the request to identify a merchant, the display of information concerning the merchant, and/or the indication of consent, could be entered into a computer other than the first customer device 102, e.g., the first customer's home computer, that is logged in to the first customer's account on the payment service system 108. In any event, should the first customer indicate consent to perform the transaction, at least an identification of the merchant and the location information for the merchant is sent to the mobile device 102.

The mobile device determines whether it is within the predetermined distance from the merchant (step 304). In some implementations, if the mobile device does not have the current location of the merchant, or if the merchant updated its location information, the merchant location can be pushed or pulled into the mobile device. Alternatively, if the first customer opts in to sharing of location information, the location information of the mobile device can be provided to the server of the payment service system 108, and the server determines the distance between the merchant and the mobile device.

As described above, if the mobile device determines the first customer's mobile device is not within a predetermined distance (e.g. 500 feet), the mobile device displays a message indicating its inability to check in (e.g., a "too far to check in" message) and rejects the first customer's request (step 308). In this case, the mobile device can view information about the merchant, but cannot check in. In other words, the merchant cannot charge the first customer's financial account using a cardless payment transaction until the first customer is within the predetermined distance and the merchant has the first customer's consent.

On the other hand, if the mobile device is within the predetermined distance, the mobile device sends an indication of proximity to the server of the payment service system (step 306). In some implementations, the first customer can automatically check in. That is, consent to a cardless payment transaction can be given by the first customer before the first customer physically arrives at the merchant or at the merchant's point-of-sale device. For example, the first customer requests to automatically check in with a merchant. While this option is enabled, the mobile device can automatically detect when it is within the predetermined distance and send the indication of proximity. The indication of proximity can be determined using wireless network geofencing or GPS signals. In some implementations, if the mobile device is not within the predetermined distance, the customer application will not permit the indication of consent to be provided. In some implementations, if the mobile device is not within the predetermined distance when an indication of consent is provided, the customer application will require that the first customer again provide an indication of consent when the mobile device is within the predetermined distance.

After the server receives this indication of proximity, the server system sends the indication of the mobile device's presence and personal identifying information to the merchant device (step 310). In some implementations, personal identifying information includes the first customer's name and picture. Once additional customers join the transaction, the server sends an indication of presence and personal identifying information for each joining customer.

Upon receipt of this information, the merchant device displays the one or more customers' identifying information (step 314) on the graphical user interface (GUI) of the merchant application. In some implementations, through the GUI of the merchant application, the merchant can select items that the one or more customers have sought to purchase. The application can be configured to associate individual prices with each of the merchant's items, and the application can automatically sum the total transaction amount that the customers owe. In some implementations, the merchant can enter into the application a total sum of prices for all the items the customers wish to purchase, as well as tax or tip. The customers can authorize payment for a transaction by each verbally notifying the merchant. For example, a customer named John Smith at a restaurant can tell the merchant, "Put the hamburger on John Smith." Another customer to the transaction named Jane Doe can tell the merchant, "Put the salad on Jane Doe." In this way, the customers need not interact with a point-of-sale device, e.g., need not press an approve button on a user interface of the point-of-sale device or electronically sign.

As another example, a customer at a bar can "check in" at a bar to start a running tab with the merchant. The customer can continually order items at the bar. As other customers join the transaction, each of the other customers can also order items at the bar. The ordered items are added to the running tab. The customers can continue to order items until each customer closes the cardless payment transaction, e.g., closes the tab, and each customer authorizes payment for the transaction.

Each customer can close the tab by verbally notifying the merchant. In some implementations, the tab is automatically closed after a period of time, e.g., 2 hours. In some other implementations, a merchant can close the tab using the merchant application. Also, the merchant can track, using the merchant application, items each customer has purchased over time, e.g., the merchant application can display an itemized tab for the cardless payment transaction as items are being ordered.

Before or after the customers authorize payment for the transaction, the merchant verifies each customer's identity (step 316). In some implementations, the merchant ensures the image displayed on the merchant device matches each customer who is present in person. Assuming that the image matches, the merchant selects the transaction using the GUI of the merchant application. In some implementations, the merchant can ask each customer for more identifying information before processing the transaction such as the customer's birthday, address, or other personal identifying information. After verifying each customer's identity, the merchant interfaces with the merchant application to start processing the transaction.

In some implementations, the amount to be charged exceeds a predetermined amount set by a customer, the merchant or the cardless payment processor. In this case, the customer enters in a PIN associated with the customer's account into the merchant device. The merchant device verifies the PIN with the server. Alternatively, the server system may communicate with the customer device and cause the customer device to request that the customer enter the PIN into the customer device. In yet another alternative, the server system can ask the customer to confirm the payment on the customer device, removing the need to enter a PIN.

The merchant's device sends a record of the requested transaction to the server (step 318). The server system continues processing the requested transaction (step 320) by sending the record to the computer system of the card payment network 116, e.g., Visa or MasterCard, and the card payment network 116 then sends the record to the card issuer, e.g., the bank, as described above.

If the transaction fails because it would exceed the credit limit or there are insufficient funds in the financial account, the server notifies the merchant application. In some implementations, the server can notify both the merchant application and each customer application.

If the transaction succeeds and the server system receives approval from the card payment network 116, the server system communicates this to the merchant device. The merchant device then captures the transaction. In the capture stage, the approved transaction is again routed from the merchant to the credit card processor, card network and card issuer. The record of the transaction in the capture stage can include the cardholder's signature (if appropriate), or other information. The capture state can trigger the financial transaction between the card issuer and the merchant. On receipt of an indication from the card network that the transaction has been captured, the server system optionally creates receipts to send to each customer, e.g., through the customer application and/or through the previously provided contact email, and to the merchant (step 322). Both devices can display the receipt in each of their applications (steps 324, 326). Optionally, each customer may be permitted to opt out of notification.

Cardless payment transactions are described further in U.S. Patent Application No. 61/563,022, entitled "Cardless Payment Transactions," filed Nov. 22, 2011, which is incorporated herein by reference in its entirety.

Figure 4:
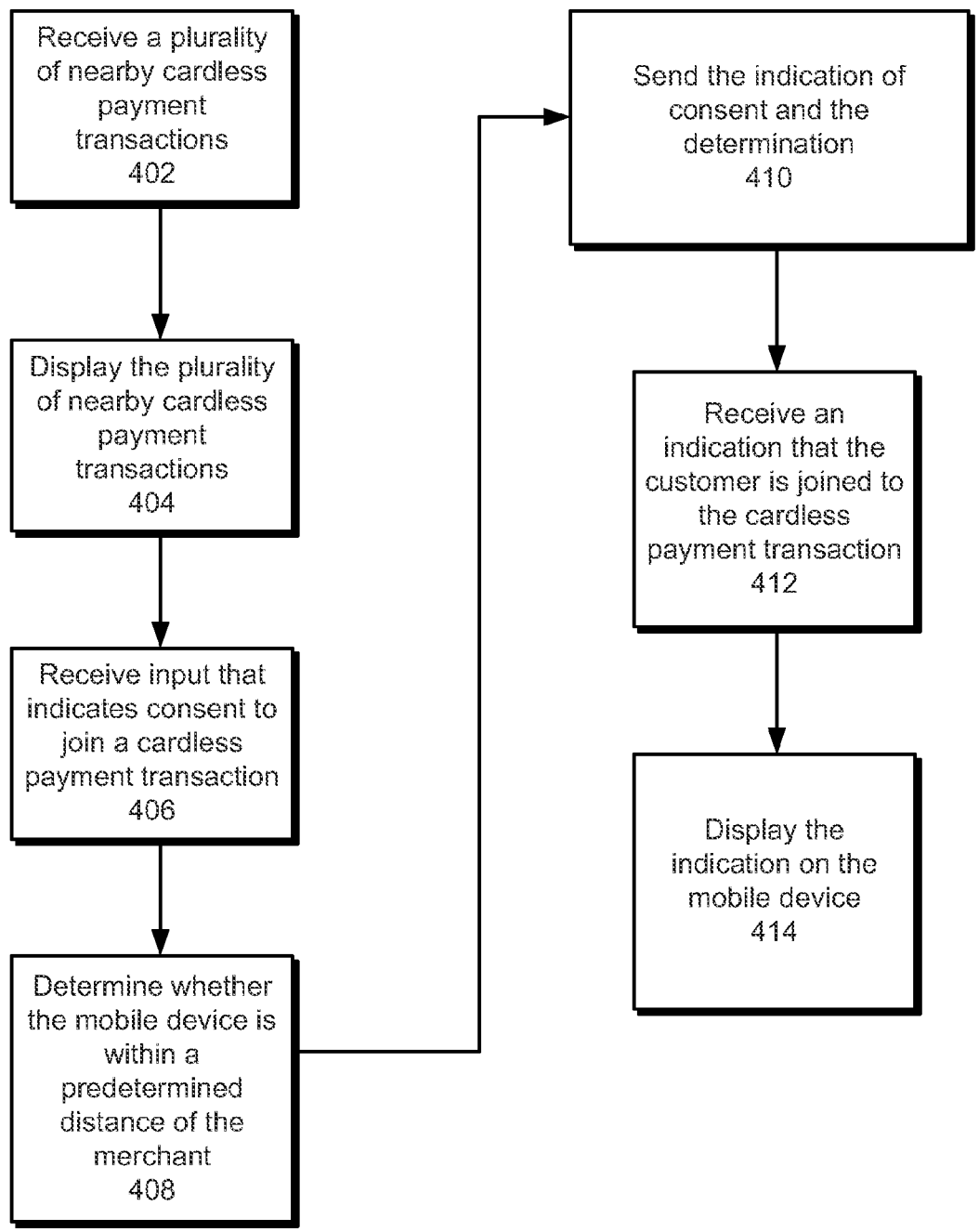
FIG. 4 is a flow chart of an example method of displaying nearby cardless payment transactions on a mobile device.

FIG. 4 is a flow chart of an example method of a mobile device joining a cardless payment transaction. The method will be described between two customers, but the method can be applied to three or more customers. In some implementations, to join a transaction, the cardless payment transaction has already been initiated between a first customer and a merchant and has not yet been authorized for payment by the first customer, e.g., with an open tab at a bar as described above in reference to FIG. 3.

A second customer can join the cardless payment transaction, e.g., be added to the open tab at a bar or restaurant, using a mobile device of the second customer. The second mobile device 102b can send a request to a payment service system to identify nearby cardless payment transactions. The request can include a current location of the second mobile device 102b.

The payment service system can generate a list of cardless payment transactions that are ongoing, e.g., have an open tab, and are occurring near the location of the second mobile device 102b. For example, the payment service system can calculate a distance between the location of the second mobile device 102b and the location of a customer or a merchant device that is associated with an ongoing cardless payment transaction. The location of the customer or merchant device can be stored in an external database associated with the payment service system. The list of cardless payment transactions can be ordered by proximity of the location to the second customer's mobile device. The payment service system can include, in the list, cardless payment transactions that have calculated distances within a threshold distance, e.g., the geo-location radius 206 in reference to FIG. 2, and send the list to the mobile device.

In some implementations, the payment service system only includes, in the list, cardless payment transactions that have one or more customers who are associated with the second customer, e.g., the second customer and one or more customers of the transaction are "friends" in a social network or are connected through the payment service system. For example, the first customer can view a public account profile of the second customer using a customer application on the device of the first customer. The first customer can, e.g., using a user interface, send an invitation to connect with the second customer. The payment service system receives the invitation and notifies a customer application running on a mobile device of the second customer. In some implementations, the second customer accepts the invitation, e.g., using a user interface, and the first and second customers are associated with each other, e.g., connected.

The second mobile device 102b receives a list of nearby cardless payment transactions from the payment service system (step 402), e.g., using a wireless data connection. Upon receiving the list, the second mobile device displays the list of nearby cardless payment transactions (step 404), e.g., on a display of the second mobile device.

The second mobile device then receives input, e.g., based on input from the second customer on a user interface of the second mobile device, that selects a cardless payment transaction from the list of nearby cardless payment transactions and indicates consent to join the selected cardless payment transaction (step 406). An example user interface is described below in reference to FIG. 5. The second mobile device 102b determines whether it is within a predetermined distance of the merchant (step 408), as discussed above in reference to FIG. 3. The second mobile device 102b sends the indication of consent and the determination to the payment service system (step 408). If the second mobile device 102b is within the predetermined distance, then the payment service system determines that the second customer can join the cardless payment transaction. As described below in reference to FIG. 7, the second mobile device 102b then receives an indication that the second customer is joined to the transaction (step 412). The second mobile device 102b displays the indication (step 414), which serves as a notification that the customer can purchase items or services using the cardless payment transaction. In some implementations, the first mobile device 102a of the first customer is also notified of the second customer's joining by the payment service system. In this case, the first mobile device 102a displays an indication that the second customer has joined the cardless payment transaction.

Instead of the second customer sending a request for nearby cardless transactions, the first customer, e.g., the initiating customer, can invite the second customer to join the cardless payment transaction. In particular, the first mobile device 102a receives input from the first customer requesting that invitations to join the transaction be sent to other customers, and receives input from the first customer identifying the second customer. In some implementations, the first mobile device 102a can display a list of users, and receives input from the first customer selecting the second customer from the list. In some implementations, the first mobile device 102a can receive input from the first customer identifying the second customer, e.g., by entry of the user name of the second customer in a text box. The list of users could be users who are associated with the first customer, e.g., have previously accepted a "friend" invite from the first customer, and/or are users who have previously consented to receive invitations to join transactions.

In some implementations, the invitation can only be sent if the second customer's mobile device 102b is located within a threshold distance from the merchant, e.g., the geo-location radius 206 in reference to FIG. 2. In some other implementations, the invitation can be sent regardless of a location of the second customer's mobile device 102b, but the second customer will only be joined to the transaction once the mobile device 102b of the second customer is within the threshold distance.

A customer application of the first customer can send the invitation to the payment service system. The payment service system can forward the invitation to the second customer's mobile device, e.g., through a "push" notification or other type of message delivery system. When the second customer's device receives the invitation, the second customer can accept the invitation, e.g., through a user interface of the second customer's device. Upon accepting the invitation, the second customer's device can send a notification of acceptance to the payment service system. The payment service system can forward the notification to the first customer's device and the appropriate merchant device, which will be described further below in reference to FIG. 7. The notification can implicitly be an indication of consent for the second customer to join the cardless payment transaction.

After the second customer joins the transaction, the mobile device can receive input that indicates one or more modifications to the cardless payment transaction. The one or more modifications can change an amount owed by one or more customers associated with the cardless payment transaction, e.g., the first customer and/or the second customer. This will be described further below in reference to FIGS. 6A and 6B. The mobile device can send the input to a payment service system for processing.

Figure 5:
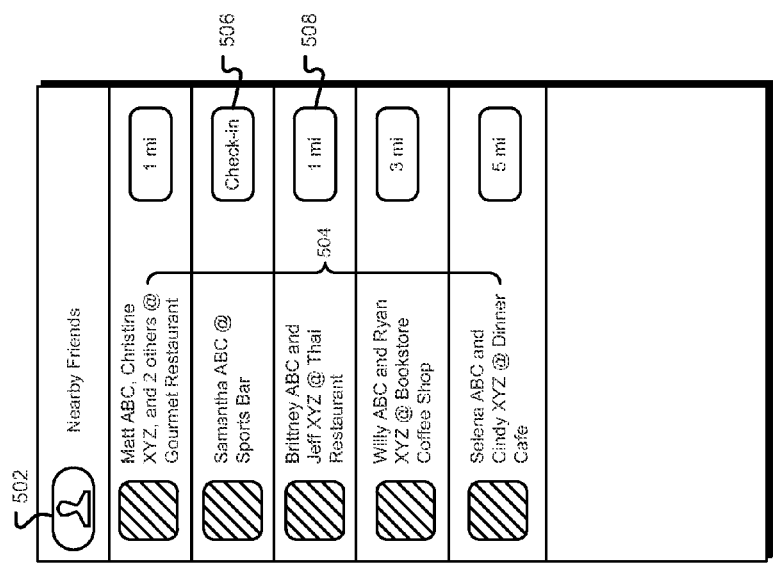
FIG. 5 is a diagram of an example user interface of a mobile device joining a cardless payment transaction.

FIG. 5 is a diagram of an example user interface of a mobile device displaying nearby cardless payment transactions. The user interface can be displayed on an application running on the mobile device, e.g., the customer's mobile device. The application can present customer account information when a user taps an account button 502. The application can retrieve a list of nearby cardless payment transactions 504 in response to an application query, e.g., on startup of the application. Each nearby cardless payment transactions 504 can include participants, e.g., customers, of each transaction and an associated merchant. The application can display the list of transactions 504 and a picture of the participants or a merchant logo. If the current location of the mobile device is within a predetermined distance of a merchant, the application can display a "Check-in" button 506. For example, a customer named "Samantha ABC" has a cardless payment transaction with the merchant "Sports Bar". By tapping the check in button, the application can perform the process described above in reference to FIG. 4 and join the customer of the mobile device to Samantha's cardless payment transaction. If the mobile device's current location is not within the predetermined distance, the application can display a distance 508 from the mobile device to the merchant. By tapping the distance, the mobile device can display more information about the merchant, the participants, or the associated cardless payment transaction.

In some implementations, the cardless payment transaction can be kept private. That is, either a customer or a merchant can choose to keep a cardless payment transaction from being displayed in a list of nearby cardless payment transactions. Privacy settings can be established in account settings of the customer and/or the merchant.

Figure 6B:
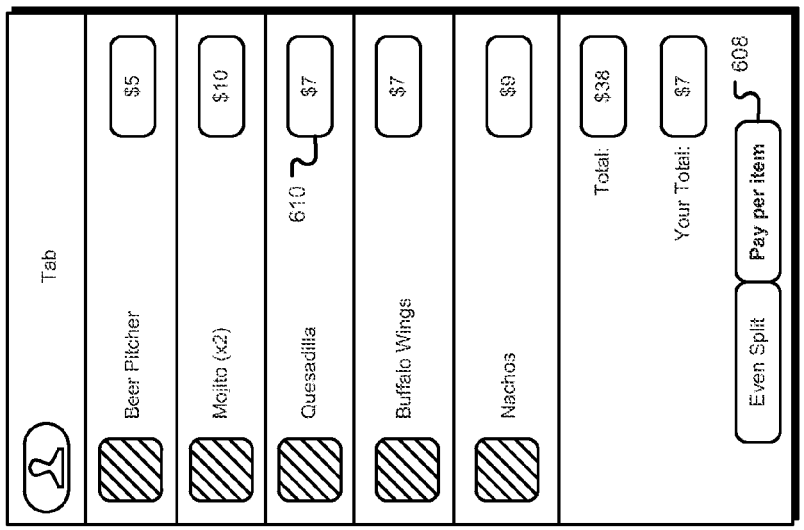
FIGS. 6A-B are diagrams of example user interfaces of a mobile device managing a cardless payment transaction.
Figure 6A:
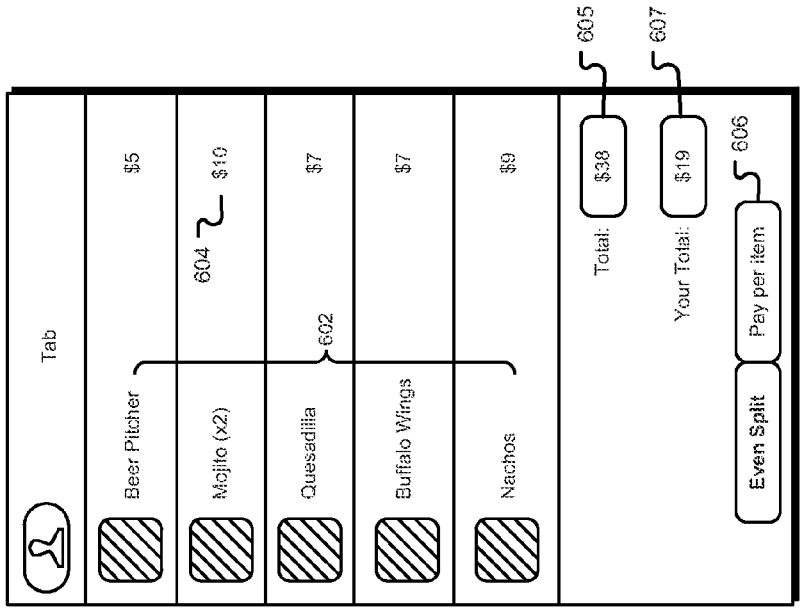

FIGS. 6A-B are diagrams of example user interfaces of a mobile device managing a cardless payment transaction. The example user interfaces can be displayed on a mobile device of a customer that initiates the cardless payment transaction or on a mobile device of another customer that joins the cardless payment transaction. Any mobile device managing the cardless payment transaction can display a list of items or services associated with the cardless payment transaction.

FIG. 6A is a diagram of an example user interface on a mobile device of a bill being split equally. When customers associated with the transaction order a new item from a merchant, the merchant can continuously update the cardless payment transaction, and therefore, the bill. The cardless payment transaction can be updated on a merchant application, which can send the update to a payment service system. The payment service system tracks the new purchases and can send updates in real time, e.g., using push technology, to mobile devices of customers associated with the transaction. In some implementations, once the mobile device is associated with the cardless payment transaction, the mobile device can retrieve, from a payment service system, and display a list of items on a bill 602 associated with the cardless payment transaction. For example, the cardless payment transaction can be between multiple customers, e.g., two customers, and a merchant "Sports Bar." The customers to the cardless payment transaction have ordered beer, two mojitos, a quesadilla, buffalo wings, and nachos as shown in FIG. 6A. The list of items can include a price 604 and an icon for a respective item. The mobile device can also display a total of the entire bill 605 and a total of a customer's individual portion of the bill 607. The amount of the individual portion can be calculated according to a method of splitting a bill. Bills can be split evenly 606 or paid on a per item 608 basis. In this case, because there are two customers and the "Even Split" option is selected, the individual portion is half of the total of the entire bill. Other types of payment are possible, e.g., split on a percentage basis or split on an absolute amount basis. The amount of the individual portion can be provided by the mobile device, the merchant device, or the payment service system.

FIG. 6B is a diagram of an example user interface of a bill being split on a per item basis. Instead of the bill being split evenly, the bill can be paid on a per item basis based on input from one or more customers to the cardless payment transaction. In some implementations, any customer can modify an individual amount owed on the bill. In some other implementations, only the customer that initiates the cardless payment transaction can modify the individual amounts owed. The prices on the bill can be represented as buttons, e.g., button 610. If a customer selects a button, e.g., by tapping on a display, the customer can choose to be responsible for the item associated with the button and can pay for the item when the cardless payment transaction is submitted for authorization, e.g., when the tab is closed. For example, if a customer taps button 610, the customer can be responsible for the cost of that individual item ($7). The customer can pay for more items by tapping each button associated with the items. In some implementations, the cost of each new item added to the cardless payment transaction is initially split equally among each customer. Other user interfaces are possible.

In some implementations, a customer has an option to finalize, e.g., pay for, an individual portion of a cardless payment transaction while other customers associated with the cardless payment transaction continue to purchase items. For example, if a customer needs to leave a merchant early while other customers are staying, the customer can finalize an individual portion of the transaction, e.g., through a user interface of a customer application. The customer application can send an indication of finalizing a portion of the transaction to a payment service system. The payment service system can process the indication and charge the customer for the individual portion of the transaction, e.g., submit the transaction to a financial service for authorization. The payment service system can update the transaction based on the charge and send the update to the merchant and each customer associated with the transaction. The merchant and customers' devices can display the update, and the updated amount owed will be reflective of the charge.

Figure 7:
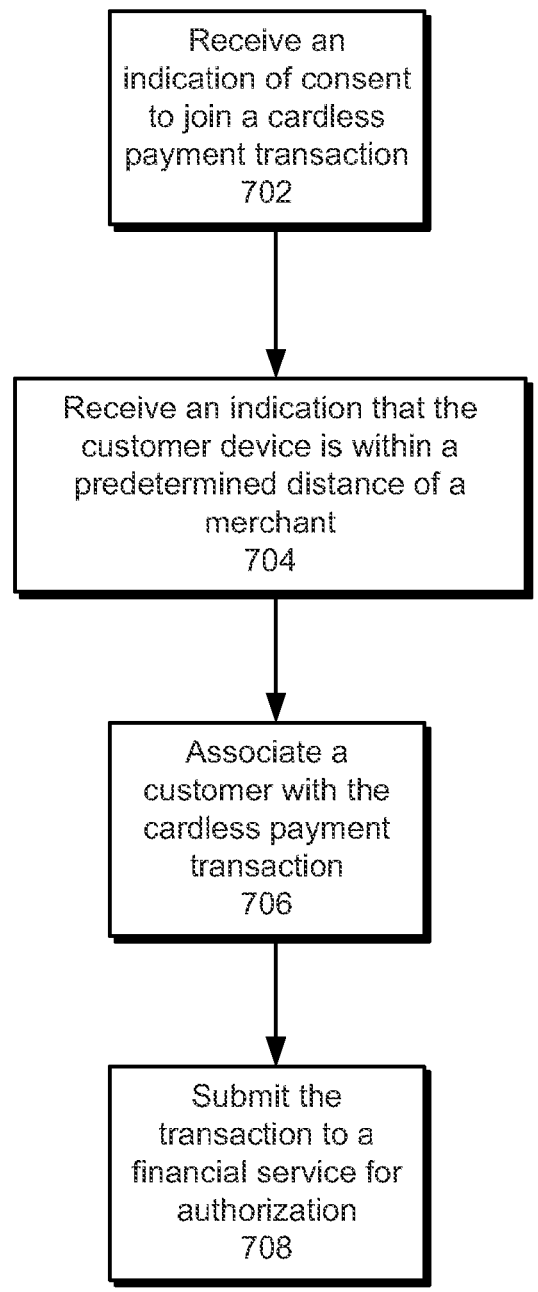
FIG. 7 is a flow chart of an example method of conducting a cardless payment transaction with multiple customers using a payment service system.

FIG. 7 is a flow chart of an example method of conducting a cardless payment transaction with multiple customers using a payment service system. The payment service system receives an indication of consent from a customer to join the cardless payment transaction (step 702). In some implementations, the payment service system receives an indication that the customer device is within a predetermined distance of the merchant (step 704). If the customer device is within the predetermined distance, the payment service system can associate the customer with the cardless payment transaction, e.g., joins the customer to the transaction (step 706). After the customer is associated with the transaction, the payment service system can send a notification of the joining to the merchant device and each customer associated with the transaction.

The payment service system can send updates of the transaction to the payment service system. The updates can be received from customer or merchant devices. The payment service system can forward any purchase notification to each customer for each item or service added to the transaction. The payment service system can also forward any modifications to the transaction, as described above in reference to FIGS. 6A-B, to each customer and to the merchant.

After the transaction is finalized, e.g., the customers close a running tab and a merchant receives the respective signatures of the customers, if necessary, the merchant device can send transaction data to the payment service system. The transaction data can include payment details for each customer, payment amounts for each customer, itemized description of the bill, signatures for each customer, or other relevant transaction information. After receiving the transaction data, the payment service system can submit the transaction to a financial service for authorization (step 708). If the transaction is approved, the payment service system can send a combined receipt to the merchant. The combined receipt can be generated by aggregating payments from each customer associated with the transaction. The combined receipt can include one bill amount, one tax amount, and one tip amount. In some implementations, the payment service system also sends, to the merchant, individual receipts of each paying customer associated with the transaction. The payment service system can send individual receipts and/or a combined receipt to each customer associated with the transaction.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving, from a first user device associated with a first user, a request for at least one nearby cardless payment transaction with a merchant initiated by social contacts of the first user;
identifying one or more nearby cardless payment transactions, each nearby cardless payment transaction being a cardless payment transaction initiated by a respective user with the merchant via a respective user device, the respective user device being within a threshold distance of a location of the merchant;
identifying a first nearby cardless payment transaction of the one or more nearby cardless payment transactions, the first nearby cardless payment transaction being initiated by a second user who is a social contact of the first user in a social networking system;
receiving, from the first user device, an indication of proximity of the first user device to the location of the merchant, wherein the indication of proximity is based at least in part on a global positioning system (GPS) in the first user device and an application running on the first user device as a background process automatically detecting that the first user device is proximate to the location of the merchant;
in response to receiving the indication of proximity, automatically joining the first user to the first nearby cardless payment transaction initiated by the second user with the merchant, wherein the indication of proximity includes a consent by the first user to conduct a cardless payment transaction with the merchant, based at least in part on a configuration setting on the first user device;
receiving, from the first user device, an authorization of the first nearby cardless payment transaction initiated by the second user with the merchant;
receiving transaction data including a payment amount for the first user in the first nearby cardless payment transaction; and
processing a cardless payment between the merchant and the first user according to the payment amount for the first user.

2. The method of claim 1, wherein identifying the first nearby cardless payment transaction comprises:
obtaining one or more contacts of the first user in the social networking system; and
determining that the first nearby cardless payment transaction of the one or more nearby cardless payment transactions was initiated by the second user who is among the one or more contacts of the first user in the social networking system.

3. The method of claim 1, further comprising receiving one or more modifications to the first nearby cardless payment transaction, wherein the one or more modifications change a payment amount owed by the first user.

4. The method of claim 3, wherein the one or more modifications include one or more of the following: splitting a total cost of the transaction equally, splitting the total cost on a percentage basis, or splitting the total cost on a per-item basis.

5. The method of claim 1, further comprising sending a receipt to the merchant, wherein the receipt includes a single bill amount, a single tax amount, or a single tip amount.

6. The method of claim 1, further comprising sending an individual receipt to the merchant for the first user, wherein the individual receipt includes payment information between the first user and the merchant.

7. A method comprising:
sending, to a server system by a first user device associated with the first user, a request for nearby cardless payment transactions initiated by social contacts of the first user, each nearby cardless payment transaction being a cardless payment transaction initiated by a respective social contact of the first user with a merchant at a merchant location that is within a threshold distance of a location of the first user device;

receiving, from the server system, information identifying one or more nearby cardless payment transactions initiated by respective social contacts of the first user with the merchant;

sending, to the server system, user input comprising an indication of consent to join the first user to a first nearby cardless payment transaction of the one or more nearby cardless payment transactions;

determining, by an application running on the first user device, that the current location of the first user device is within a threshold distance of the merchant location;

sending, to the server system, an indication of proximity of the first user device to the merchant location, wherein the indication of proximity is based at least in part on the first user device being with the threshold distance of the merchant location and an application running on the first user device automatically detects that the first user device is proximate to the merchant location;

in response to sending the indication of proximity, automatically joining the first user to the first nearby cardless payment transaction; and receiving an indication that the first user has been successfully joined to the first nearby cardless payment transaction.

8. The method of claim 7, further comprising:

displaying, on a display of the first user device, a presentation of the one or more nearby cardless payment transactions, wherein the user input further comprises a user selection of the first nearby cardless payment transaction.

9. A method comprising:

receiving, from a server system at a first user device associated with a first user, information identifying one or more nearby cardless payment transactions initiated by social contacts of the first user, each nearby cardless payment transaction being a cardless payment transaction initiated by a respective social contact of the first user with a merchant at a merchant location that is within a threshold distance of a location of the first user device;

displaying, at the first user device, the one or more nearby cardless payment transactions initiated by the social contacts of the first user;

sending, from the first user device to the server system, user input selecting a first nearby cardless payment transaction of the one or more nearby cardless payment transactions displayed at the user device, wherein the first nearby cardless payment transaction was initiated by a second user with the merchant, the second user being a social contact of the first user and the user input comprises an indication of consent to join the first user to the first nearby cardless payment transaction;

sending, from the first user device to the server system, an indication of proximity of the first user device to the location of the merchant, wherein the indication of proximity is based at least in part on a global positioning system (GPS) in the first user device and an application running on the first user automatically detects that the first user device is proximate to the merchant location;

in response to sending the user input and the indication of proximity, automatically joining the first user to the first nearby cardless payment transaction; and receiving, from the server system, an indication that the first user is participating in the first nearby cardless payment transaction.

10. The method of claim 9, further comprising sending, to the server system, a request for the one or more nearby cardless payment transactions initiated by the social contacts of the first user.

11. A computer program product encoded on a non-transitory computer storage medium, operable to cause data processing apparatus to perform operations to manage a cardless payment transaction between a first user and a merchant, the operations comprising:

receiving, from a first user device associated with a first user, a request for nearby cardless payment transactions initiated by social contacts of the first user;

identifying one or more nearby cardless payment transactions, each nearby cardless payment transaction being a cardless payment transaction initiated by a respective user with a merchant at a merchant location that is within a threshold distance of a location of the first user device;

identifying a first nearby cardless payment transaction of the one or more nearby cardless payment transactions, the first nearby cardless payment transaction being initiated by a second user who is a social contact of the first user in a social networking system;

receiving, from the first user device, an indication of proximity of the first user device to the location of the merchant, wherein the indication of proximity is based at least in part on a global positioning system (GPS) in the first user device and an application running on the first user device automatically detects that the first user device is proximate to the merchant location;

in response to receiving the indication of proximity, automatically joining the first user to the first nearby cardless payment transaction initiated by the second user with the merchant, wherein the indication of proximity constitutes a consent by the first user to conduct a cardless payment transaction with the merchant based at least in part on a configuration setting on the first user device;

receiving, from the first user device, an authorization of the first nearby cardless payment transaction initiated by the second user with the merchant;

receiving transaction data including a payment amount for the first user in the first nearby cardless payment transaction; and processing a cardless payment between the merchant and the first user according to the payment amount for the first user.

12. The computer program product of claim 11, wherein identifying the first nearby cardless payment transaction comprises:

obtaining one or more contacts of the first user in a social networking system; and determining that the first nearby cardless payment transaction of the one or more nearby cardless payment transactions was initiated by the second user who is among the one or more contacts of the first user in the social networking system.

13. The computer program product of claim 11, wherein the operations further comprise receiving one or more modifications to the cardless payment transaction, wherein the one or more modifications change the payment amount owed by the first user.

14. The computer program product of claim 13, wherein the one or more modifications include one or more of the following: splitting a total cost of the transaction equally, splitting the total cost on a percentage basis, or splitting the total cost on a per-item basis.

15. The computer program product of claim 11, wherein the operations further comprise sending a receipt to the merchant, wherein the receipt includes a single bill amount, a single tax amount, or a single tip amount.

16. The computer program product of claim 11, wherein the operations further comprise sending an individual receipt to the merchant for the first user, wherein the individual receipt includes payment information between the first user and the merchant.

17. A computer program product encoded on a non-transitory computer storage medium, operable to cause data processing apparatus to perform operations to manage a transaction between a first user and a merchant, the operations comprising:
- sending, to a server system by a first user device associated with the first user, a request for nearby cardless payment transactions initiated by social contacts of the first user, each nearby cardless payment transaction being a cardless payment transaction initiated by a respective social contact of the first user with a merchant at a merchant location that is within a threshold distance of a location of the first user device;
- receiving, from the server system, information identifying one or more nearby cardless payment transactions initiated by respective social contacts of the first user with the merchant;
- sending, to the server system, user input comprising an indication of consent to join the first user to a first nearby cardless payment transaction of the one or more nearby cardless payment transactions;
- determining, by an application using a global positioning system (GPS) and running as a background process on the first user device, that the current location of the first user device is within a threshold distance of the merchant location;
- sending, to the server system, an indication of proximity of the first user device to the merchant location, wherein the indication of proximity is based at least in part on the first user device being with the threshold distance of the merchant location and the application running on the first user device automatically detects that the first user device is proximate to the merchant location;
- in response to sending the indication of proximity, automatically joining the first user to the first nearby cardless payment transaction; and
- receiving an indication that the first user has been successfully joined to the first nearby cardless payment transaction.

18. The computer program product of claim 17, wherein the operations further comprise:
- displaying, on a display of the first user device, a presentation of the one or more nearby cardless payment transactions, wherein the user input further comprises a user selection of the first nearby cardless payment transaction.

19. A computer program product encoded on a non-transitory computer storage medium, operable to cause data processing apparatus to perform operations to manage a transaction between a first user, a second user, and a merchant, the operations comprising:
- receiving, from a server system at a first user device associated with the first user, information identifying one or more nearby cardless payment transactions initiated by social contacts of the first user, each nearby cardless payment transaction being a cardless payment transaction initiated by a respective social contact of the first user with a merchant at a merchant location that is within a threshold distance of a location of the first user device;
- displaying, at the first user device, the one or more nearby cardless payment transactions initiated by the social contacts of the first user;
- sending, from the first user device to the server system, user input selecting a first nearby cardless payment transaction of one or more nearby cardless payment transactions displayed at the user device, wherein the first nearby cardless payment transaction was initiated by a second user with the merchant, the second user being a social contact of the first user and the user input comprises an indication of consent to join the first user to the first nearby cardless payment transaction;
- sending, from the first user device to the server system, an indication of proximity of the first user device to the location of the merchant, wherein the indication of proximity is based at least in part on a global positioning system (GPS) in the first user device and an application running on the first user device automatically detect that the first user device is proximate to the merchant location;
- in response to sending the user input and the indication of proximity, automatically joining the first user to the first nearby cardless payment transaction; and
- receiving, from the server system, an indication that the first user has been joined to the first nearby cardless payment transaction.

20. The computer program product of claim 19, wherein the operations further comprise sending, to the server system, a request for the one or more nearby cardless payment transactions initiated by the social contacts of the first user.

21. A system comprising:
- one or more computers and one or more storage devices storing instructions that are operable, when executed by the one or more computers, to cause the one or more computers to perform operations to manage a cardless payment transaction between a first user and a merchant, the operations comprising:
- receiving, from a first user device associated with the first user, a request for nearby cardless payment transactions with the merchant, initiated by social contacts of the first user;
- identifying one or more nearby cardless payment transactions, each nearby cardless payment transaction being a cardless payment transaction initiated by a respective user with the merchant via a respective user device, the respective user device being within a threshold distance of a location of the merchant;
- identifying a first nearby cardless payment transaction of the one or more nearby cardless payment transactions, the first nearby cardless payment transaction being initiated by a second user who is a social contact of the first user in a social networking system;
- receiving, from the first user device, an indication of proximity of the first user device to the location of the merchant, wherein the indication of proximity is based at least in part on a global positioning system (GPS) in the first user device and an application running on the first user device automatically detects that the first user device is proximate to the location of the merchant;
- in response to receiving the indication of proximity, automatically joining the first user to the first nearby cardless payment transaction initiated by the second user with the merchant, wherein the indication of proximity constitutes a consent by the first user to conduct a cardless payment transaction with the merchant based at least in part on a configuration setting on the first user device;

receiving, from the first user device, an authorization of the first nearby cardless payment transaction initiated by the second user with the merchant;

receiving transaction data including a payment amount for the first user in the first cardless payment transaction; and processing a cardless payment between the merchant and the first user according to the payment amount for the first user.

22. The system of claim 21, wherein identifying the first nearby cardless payment transaction comprises:

obtaining one or more contacts of the first user in a social networking system; and determining that the first nearby cardless payment transaction of the one or more nearby cardless payment transactions was initiated by the second user who is among the one or more contacts of the first user in the social networking system.

23. The system of claim 21, wherein the operations further comprise receiving one or more modifications to the cardless payment transaction, wherein the one or more modifications change the payment amount owed by the first user.

24. The system of claim 23, wherein the one or more modifications include one or more of the following: splitting a total cost of the transaction equally, splitting the total cost on a percentage basis, or splitting the total cost on a per-item basis.

25. The system of claim 21, wherein the operations further comprise sending a receipt to the merchant, wherein the receipt includes a single bill amount, a single tax amount, or a single tip amount.

26. The system of claim 21, wherein the operations further comprise sending an individual receipt to the merchant for the first user, wherein the individual receipt includes payment information between the first user and the merchant.

27. A system comprising:

one or more computers and one or more storage devices storing instructions that are operable, when executed by the one or more computers, to cause the one or more computers to perform operations to manage a transaction between a first user and a merchant, the operations comprising:

sending, to a server system by a first user device associated with the first user, a request for nearby cardless payment transactions initiated by social contacts of the first user, each nearby cardless payment transaction being a cardless payment transaction initiated by a respective social contact of the first user with a merchant at a merchant location that is within a threshold distance of a location of the first user device;

receiving, from the server system, information identifying one or more nearby cardless payment transactions initiated by respective social contacts of the first user with the merchant;

sending, to the server system, user input comprising an indication of consent to join the first user to a first nearby cardless payment transaction of the one or more nearby cardless payment transactions;

determining, by an application using a global positioning system (GPS) and running as a background process on the first user device, that the current location of the first user device is within a threshold distance of the merchant location;

sending, to the server system, an indication of proximity of the first user device to the merchant location, wherein the indication of proximity is based at least in part on the first user device being with the threshold distance of the merchant location and the application running on the first user device automatically detects that the first user device is proximate to the merchant location;

in response to sending the indication of proximity, automatically adding the first user to the first nearby cardless payment transaction; and receiving an indication that the first user has been successfully joined to the first nearby cardless payment transaction.

28. The system of claim 27, wherein the operations further comprise:

displaying, on a display of the first user device a presentation of the one or more nearby cardless payment transactions, wherein the user input further comprises a user selection of the first nearby cardless payment transaction.

29. A system comprising:

one or more computers and one or more storage devices storing instructions that are operable, when executed by the one or more computers, to cause the one or more computers to perform operations to manage a transaction between a first user, a second user, and a merchant, the operations comprising:

receiving, from a server system at a first user device associated with the first user, information identifying one or more nearby cardless payment transactions initiated by social contacts of the first user, each nearby cardless payment transaction being a cardless payment transaction initiated by a respective social contact of the first user with a merchant at a merchant location that is within a threshold distance of a location of the user device;

displaying, at the first user device, the one or more nearby cardless payment transactions initiated by the social contacts of the first user;

sending, from the first user device to the server system, user input selecting a first nearby cardless payment transaction of one or more nearby cardless payment transactions displayed at the user device, wherein the first nearby cardless payment transaction was initiated by a second user with the merchant, the second user being a social contact of the first user and the user input comprises an indication of consent to join the first user to the first nearby cardless payment transaction;

sending, from the first user device to the server system, an indication of proximity of the first user device to the location of the merchant, wherein the indication of proximity is based at least in part on a global positioning system (GPS) in the first user device and an application running on the first user device automatically detects that the first user device is proximate to the merchant location;

in response to sending the user input and the indication of proximity, automatically joining the first user to the first nearby cardless payment transaction; and receiving, from the server system, an indication that the first user has been joined to the first nearby cardless payment transaction.

30. The system of claim 29, wherein the operations further comprise sending, to the server system, a request for the one or more nearby cardless payment transactions initiated by the social contacts of the first user.

31. The system of claim 29, further comprising receiving, at the first user device, payment information comprising a payment amount owed by the first user to the merchant.

32. The system of claim 31, further comprising, in response to receipt of a payment amount owed by the first user to the merchant, sending, from the first user device to the server system, a modification to the cardless payment transaction, wherein the modification changes the payment amount owed by the first user to the merchant.

33. The system of claim 29, further comprising receiving, at the first user device, a receipt for the first nearby cardless payment transaction, wherein the receipt includes payment information between the first user and the merchant.

34. The method of claim 7, further comprising receiving, at the first user device, payment information comprising a payment amount owed by the first user to the merchant.

35. The method of claim 34, further comprising, in response to receipt of a payment amount owed by the first user to the merchant, sending, from the first user device to the server system, a modification to the cardless payment transaction, wherein the modification changes the payment amount owed by the first user to the merchant.

36. The method of claim 7, further comprising receiving, at the first user device, a receipt for the first nearby cardless payment transaction, wherein the receipt includes payment information between the first user and the merchant.

\* \* \* \* \*